United States Patent [19]

Scott et al.

[11] Patent Number: 4,951,554
[45] Date of Patent: Aug. 28, 1990

[54] LOW STRESS DIAPHRAGM

[75] Inventors: Daniel G. Scott, Swissvale; William K. Mong, No. Huntingdon; Mark S. Krampitz, Hunker; Theodore B. Hill, North Versailles; Willard P. Spalding, Penn Hills, all of Pa.

[73] Assignee: American Standard Inc., Wilmerding, Pa.

[21] Appl. No.: 299,191

[22] Filed: Jan. 19, 1989

[51] Int. Cl.$^5$ .......................... F16J 3/00; F01B 19/00
[52] U.S. Cl. ............................. 92/103 F; 92/103 SD
[58] Field of Search .................. 92/96, 103 F, 103 R, 92/103 SD, 98 R, 98 D, 100

[56] References Cited

U.S. PATENT DOCUMENTS

| | | | |
|---|---|---|---|
| 2,744,543 | 5/1956 | Brady, Jr. | 92/98 R |
| 3,051,530 | 8/1962 | Ayers, Jr. | 92/98 D |
| 3,173,342 | 3/1965 | Wilson . | |
| 3,282,171 | 11/1966 | Tuckmantel . | |
| 3,315,572 | 4/1967 | Taplin . | |
| 3,934,480 | 1/1976 | Nederlof | 92/98 D |
| 4,086,036 | 4/1978 | Hagen et al. | 92/99 |
| 4,864,918 | 9/1989 | Martin | 92/103 SD |

FOREIGN PATENT DOCUMENTS 1225863  3/1971  United Kingdom ........... 92/103 SD

Primary Examiner—Edward K. Look
Attorney, Agent, or Firm—G. J. Falce

[57] ABSTRACT

A diaphragm for a diaphragm-type piston characterized by an S-shaped or ogee-like profile approximating a theoretical model that is substantially free of distortion in a selected position of the piston assembly in which a convolution is formed in the annular space between the diaphragm piston and the body in which the piston operates. Being molded without a convolution, the diaphragm lends itself well to maintaining a reinforcing fabric centrally embedded within the diaphragm proper, while at the same time being substantially distortion-free in a selected position of the piston assembly.

11 Claims, 1 Drawing Sheet

LOW STRESS DIAPHRAGM

BACKGROUND OF THE INVENTION

The present invention relates generally to diaphragms for use in diaphragm piston assemblies, and in particular to diaphragms without a molded-in convolution.

A diaphragm convolution is the annular fold in a diaphragm that provides the diaphragm with sufficient length to accommodate piston travel through its full range of movement. The convolution may be molded-in or, in the case of conical-type diaphragms, the convolution is formed naturally when the diaphragm piston is assembled in place. The ideal diaphragm must have sufficient centerline length between its clamping points to allow a full loop convolution to form in a pressurized condition of the piston assembly. Otherwise, the forces on the diaphragm could cause the diaphragm to be pulled out of its clamping point or could cause such extreme diaphragm stress as to destroy the diaphragm.

Diaphragms having a molded-in convolution are not generally suited for the application of reinforcing fabric, due to the rather sharp radii the fabric must follow, particularly in the area of the diaphragm clamping bead. During vulcanization, the reinforcing fabric tends to revert to its natural flat shape, thus migrating toward the inside surface of the aforementioned radii. This results in the fabric so closely approaching the diaphragm surface as to render the diaphragm susceptible to ballooning under high pressure, with consequent early failure. Without resorting to the expense of custom designed fabric to avoid this problem, the recognized advantage of long diaphragm service life, therefore, is unrealized in diaphragms having a molded-in convolution.

On the other hand, conical-type diaphragms are generally better suited for use with reinforcing fabric, since the diaphragm skirt portion is molded without any convolution. However, conical-type diaphragms are subject to distortion and high stresses, since these diaphragms are unconvoluted in their natural state, but assume a convoluted configuration throughout the operating range of travel of a piston with which the diaphragm is assembled. These distortions and stresses may be defined as the change in diameter that a given point of the diaphragm undergoes during transition between extreme operating positions, and in addition to causing premature diaphragm failure, also tend to produce what is commonly known as "spring effect", in which condition the diaphragm tends to revert to its molded shape.

SUMMARY OF THE INVENTION

It is therefore an object of the present invention to provide a new and improved piston diaphragm member that is free of any molded-in convolutions, so as to be well suited for the application of reinforcing fabric in the manner of a conical type diaphragm, yet experiences only minimal distortions and stress in a critical operating condition of the diaphragm piston.

In accordance with the foregoing, there is provided a diaphragm member arranged to be mounted at its inner periphery to a piston member and at its outer periphery to a body having an operating cylinder in which the piston member is operably disposed in spaced-apart relationship with the cylinder walls. The diaphragm member is molded in a configuration in which the profile of the diaphragm skirt is shaped in the manner of an ogee-like curve approximating a theoretical ideal curve that defines a state of minimal diaphragm distortion in a selected operating condition, without the diaphragm curvature exceeding acceptable limits for maintaining proper centering of the diaphragm reinforcing fabric during vulcanization.

BRIEF DESCRIPTION OF THE DRAWINGS

The aforementioned objects and further advantages of the invention will become apparent from the following more detailed explanation of the invention when taken with the accompanying drawings in which:

FIG. 2 shows the diaphragm of FIG. 1, as employed in a piston assembly of a valve device or the like;

DESCRIPTION AND OPERATION

Figure 1:
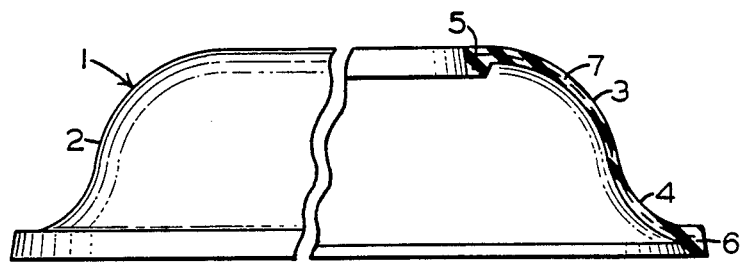
FIG. 1 shows a diaphragm member partially in outline and partially in section.

Referring now to FIG. 1, there is shown in accordance with the present invention a diaphragm member 1 having an annular skirt portion 2 generally formed between the diaphragm clamping points by annular arcuate segments 3 and 4 that are interconnected with a reverse angle of curvature. Arcuate segment 3 terminates in an annular sealing bead 5 that projects from the underside of segment 3 to form an annulus of the inner diaphragm periphery and arcuate segment 4 terminates in an annular sealing bead 6 that projects from the underside of segment 4 to form an annulus of the outer diaphragm periphery, the inner and outer diaphragm peripheries being coaxial and lying in spaced-apart parallel planes. The respective arcuate segments each cover an angle less than 90° and are interconnected at a point T, through which a line tangent to the respective arcuate segments 3 and 4 passes, this line of tangency Z having an angle $\lambda$ with a line that lies parallel with the axis of the diaphragm. The specific angle $\lambda$ and the radius of curvature of arcuate segments 3 and 4 are selected in accordance with a theoretical ideal curve, as well as other design criteria, as will be hereinafter explained. The actual profile of diaphragm 1 only approximates the aforementioned theoretical ideal curve, due to practical considerations in designing the diaphragm mold. In approximating this theoretical ideal curve, skirt portion 2 of diaphragm 1 is molded in the shape of an ogee-like curve, with arcuate segments 3 and 4 having such gradual curvature as to permit a reinforcing fabric 7 to be maintained substantially centered within the diaphragm proper during vulcanization, i.e., without the fabric approaching the surface of the diaphragm at the inside radius of curvature of arcuate segments 3 and 4, and without the actual diaphragm profile deviating significantly from the theoretical ideal curve.

Figure 2:
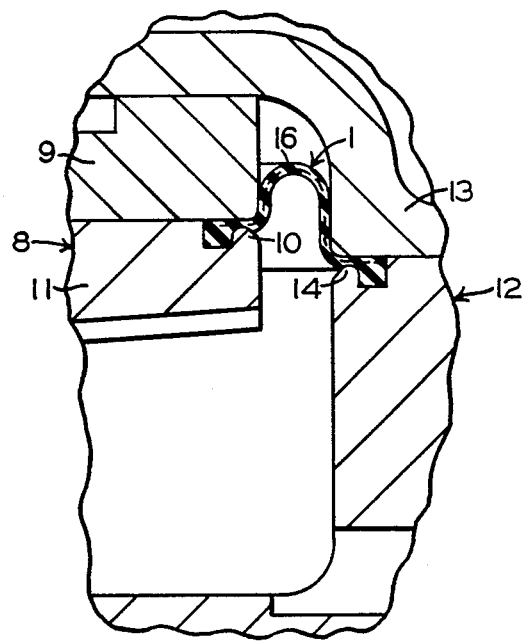

As shown in FIG. 2, diaphragm member 1 is mounted at its inner periphery to a piston member 8 by clamping the diaphragm between a plate 9 and an annular clamping bead 10 formed on a piston follower 11. Similarly, diaphragm member 1 is mounted at its outer periphery to a valve body 12, or the like, by reason of the diaphragm being clamped between a cover 13 and an annular clamping bead 14 formed on body 12. The abovedescribed diaphragm mounting arrangement is conventional, the points at which the respective clamping beads engage the diaphragm being the aforementioned diaphragm clamping points. The resultant assembly of diaphragm 1 forms an annular convolution 16 within the annular space between body 12 and piston member 8.

By way of example, piston member 8 is shown in FIG. 2 in its upward-most position, in which the diaphragm piston is assumed to be subject to a maximum pressure differential, it being understood that under such condition of pressurization, the degree of diaphragm distortion is critical. Distortion in a diaphragm, particularly when subjected to high fluid pressure forces, has a negative effect in terms of diaphragm wear and is thus especially critical insofar as achieving a long service life is concerned.

Figure 3:
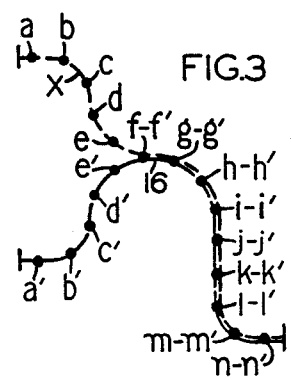
FIG. 3 is an enlarged graphic view showing how a theoretical ideal curve is generated in a critical position of the piston assembly of FIG. 2.

In determining the optimum configuration in which diaphragm 1 is molded without a convolution, yet without experiencing distortion in the convoluted configuration that the diaphragm assumes in its uppermost position shown in FIG. 2, a theoretical ideal curve X is generated, as represented by the dotted lines in FIG. 3. Ideally, each incremental point a-n along curve X should have the same diameter in the normal molded configuration shown in FIG. 1 as the diameter of the corresponding incremental points a'-n' in the convoluted configuration shown in FIG. 2. As illustrated in FIG. 3, the theoretical ideal curve X is generated by taking the mirror image of the portion of diaphragm 1 between its clamping point at the inner periphery and the midpoint of convolution 16, i.e., that portion of diaphragm 1 that must change its shape from the "as molded" configuration to the convoluted configuration formed in the uppermost position of piston member 8; and combining this mirror image with the portion of diaphragm 1 between the midpoint of convolution 16 and the diaphragm clamping point at the outer diaphragm periphery, which assumes essentially the same position in the "as molded" configuration of FIG. 1, as in the convoluted configuration of FIG. 2.

Figure 4:
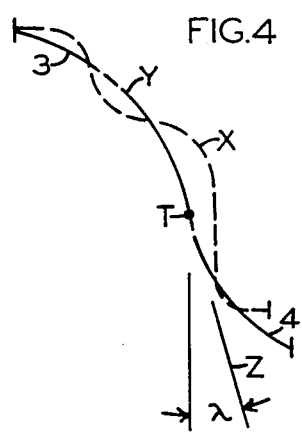
FIG. 4 is an enlarged graphic view showing the approximation of the diaphragm of FIG. 1 relative to the theoretical ideal curve of FIG. 3.

As shown in FIG. 4, dot-dash line Y represents the actual profile of diaphragm 1, which approximates the theoretical ideal curve X by generally following a path that lies between the extreme undulations in the theoretical curve. This compromise in the actual configuration of diaphragm 1 from that of the theoretical ideal curve X is desirable both from the standpoint of eliminating sharp radii in order to maintain the diaphragm reinforcing fabric centered during vulcanization and simplifying the diaphragm mold for economic reasons. Moreover, the actual profile of diaphragm 1, in deviating from the ideal profile, maintains the diaphragm profile length between clamping points, and also the diaphragm surface area, the same as that of a diaphragm designed according to the theoretical ideal curve X. These latter considerations are necessary to obtain a full diaphragm loop or convolution in the extreme pressurized position of piston travel to prevent forces from being generated that could otherwise damage the diaphragm.

The foregoing considerations can be attained by varying the radii of arcuate segments 3, 4 and/or the angle $\lambda$ or slope of skirt 2. Sufficient variation of these parameters is possible to achieve the desired considerations of diaphragm profile length and surface area, while still providing a diaphragm profile that follows an ogee-like curve generally within the undulations of the theoretical ideal curve X. In this sense, it will be appreciated that both arcuate segments 3 and 4 are less than 90°, and in this respect, the specific profile of the resultant ogee-like curve does not reverse its direction, but rather curves in the same general direction. As a further variation, arcuate segments 3 and 4 may be interconnected with an intermediate straight portion instead of being connected to each other directly. The straight portion would have an angle of inclination $\lambda$ relative to the diaphragm axis corresponding to that of the line of tangency between the directly connected arcuate segments 3 and 4. Also, the radii of arcuate segments 3 and 4 may be the same or different depending upon the theoretical ideal curve X. In all cases, however, the actual diaphragm 1 will have a profile in the form of an ogee-like curve in which either the line of tangency between the directly interconnected arcuate segments 3 and 4, or the straight portion interconnecting the arcuate segments lies at an angle $\lambda$ relative to the diaphragm axis.

Although not totally free of distortion and stress, a diaphragm 1 molded in the configuration represented by dot-dash line Y in FIG. 4 and approximating the theoretical ideal curve represented by the dotted line X exhibits only minimal distortion in the critical uppermost position of piston member 8, in which diaphragm member 1 is assumed to be subject to maximum pressure. The diaphragm 1 will also have minimum distortion when in a neutral position and thus produce minimum spring effect. Accordingly, stress is minimized in diaphragm 1, which further lends itself well to the application of reinforcing fabric to achieve a long service life.

It will be understood, of course, that diaphragm member 1, in any position of piston member 8, other than the position exemplified in FIG. 2, may be chosen to generate the theoretical ideal curve X that the specific profile of diaphragm 1 approximates in accordance with the present invention, depending upon which position is deemed critical in terms of distortion and stress of the diaphragm.

We claim:

1. A diaphragm member having coaxial inner and outer annular peripheries lying in spaced-apart, parallel planes that are perpendicular to the axis of said inner and outer peripheries, a first annular clamping point approximate said outer periphery about which said diaphragm member is clamped to said body and a second annular clamping point approximate said inner periphery about which said diaphragm member is clamped to a movable member that operates axially in a cavity of said body in spaced-apart relationship therewith to provide a diaphragm piston assembly, said diaphragm member comprising:

(a) a first annular arcuate segment having one end terminating approximate said outer periphery including said first clamping point;

(b) a second annular arcuate segment having one end terminating approximate said inner periphery including said second clamping point; and (c) said first and second arcuate segments being interconnected with a reverse angle of curvature to form an annular skirt portion intermediate said first and second clamping points having a cross-sectional shape corresponding to an ogee-like curve in which a line of tangency common to said first and second arcuate segments forms an angle with said axis; and (d) a layer of reinforcing fabric substantially centrally disposed throughout said diaphragm member.

2. A diaphragm member as recited in claim 1, wherein said diaphragm member forms an annular convolution in the space between said body and said movable member when said diaphragm member is assembled therewith, the cross-sectional shape of said diaphragm skirt portion prior to said assembly being absent said convolution by approximating a theoretical ideal curve generated by combining the mirror image of the portion of said diaphragm member between said second clamping point and substantially one half of said convolution with the other half of said convolution and said first clamping point, in a preselected axial position of said diaphragm piston assembly.

3. A diaphragm member as recited in claim 2, wherein the cross-sectional shape of said diaphragm skirt portion lies within an envelope generally delimited by the undulations of said theoretical ideal curve.

4. A diaphragm member as recited in claim 1, wherein said first and second arcuate segments are interconnected with each other at the ends opposite said one ends thereof, said first and second arcuate segments each having an angle subtended by an arc of less than 90°.

5. A diaphragm member as recited in claim 1, wherein the angle of said line of tangency and radius of curvature of said first and second arcuate segments are selected in accordance with the desired surface area of said diaphragm member.

6. A diaphragm member as recited in claim 1, wherein the radius of curvature of said first arcuate segment differs from the radius of curvature of said second arcuate segment.

7. A diaphragm member as recited in claim 6, wherein the radius of curvature of said first arcuate segment is less than the radius of curvature of said second arcuate segment.

8. A diaphragm member as recited in claim 1, further comprising first and second annular sealing beads in surrounding relationship with said outer and inner peripheries respectively.

9. A diaphragm member as recited in claim 8, wherein said first sealing bead is adjacent said first clamping point on the side thereof facing said outer periphery and said second sealing bead is adjacent said second clamping point on the side thereof facing said inner periphery.

10. A diaphragm member as recited in claim 8, wherein said first and second sealing beads project from the same surface of said diaphragm member.

11. A method of producing a molded diaphragm member having an actual profile intermediate an inner and outer periphery thereof that approximates a theoretical profile, said inner periphery being clamped in a piston that operates in an annular opening in a body in which said outer periphery is clamped, said method comprising the steps of:

(a) generating a desired profile of said diaphragm member in accordance with said piston being in a predetermined axial position in which said diaphragm member is in a critical condition of flexure, said desired profile including an annular convolution in the space between said piston and said body;

(b) generating a mirror image of said desired profile between the inner half of said convolution and said inner periphery of said diaphragm;

(c) combining said mirror image of said desired profile with the portion of said desired profile between the outer half of said convolution and said outer periphery to develop said theoretical profile wherein said theoretical profile is absent said convolution; and (d) vulcanizing said diaphragm member in a mold in which said actual profile approximates said theoretical profile.

* * * * *